(12) United States Patent
Kimayong et al.

(10) Patent No.: US 11,895,129 B2
(45) Date of Patent: Feb. 6, 2024

(54) DETECTING AND BLOCKING A MALICIOUS FILE EARLY IN TRANSIT ON A NETWORK

(71) Applicant: Juniper Networks, Inc., Sunnyvale, CA (US)

(72) Inventors: Paul Randee Dilim Kimayong, Watertown (SG); Mounir Hahad, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 269 days.

(21) Appl. No.: 17/304,958

(22) Filed: Jun. 29, 2021

(65) Prior Publication Data
US 2022/0417260 A1 Dec. 29, 2022

(51) Int. Cl.
*G06F 21/56* (2013.01)
*H04L 9/40* (2022.01)

(52) U.S. Cl.
CPC ........ *H04L 63/1416* (2013.01); *G06F 21/563* (2013.01); *G06F 21/564* (2013.01); *H04L 63/1441* (2013.01)

(58) Field of Classification Search
CPC .... G06F 21/564; G06F 21/562; G06F 21/563; G06F 21/64; G06F 21/00; G06F 21/56; G06F 21/561; H04L 63/145; H04L 51/212; H04L 63/0245; H04L 63/1408
See application file for complete search history.

(56) References Cited

U.S. PATENT DOCUMENTS

| | | | |
|---|---|---|---|
| 8,695,096 B1 | 4/2014 | Zhang | |
| 9,202,050 B1 * | 12/2015 | Nachenberg | G06F 21/56 |
| 9,332,023 B1 * | 5/2016 | Wang | H04L 63/1416 |
| 11,275,835 B2 * | 3/2022 | Chebyshev | G06F 21/64 |

(Continued)

FOREIGN PATENT DOCUMENTS

| | | | | |
|---|---|---|---|---|
| CN | 103761477 A | * | 4/2014 | ........... G06F 21/561 |
| EP | 1681609 A1 | | 7/2006 | |
| WO | 2020006415 A1 | | 1/2020 | |

OTHER PUBLICATIONS

"Firepower Management Center Configuration Guide, Version 6.0, Chapter: File Policies and Advanced Malware Protection", obtained online from <https://www.cisco.com/c/en/us/td/docs/security/firepower/60/configuration/guide/fpmc-config-guide-v60/Reference_a_wrapper_Chapter_topic_here.html>, retrieved on (Year: 2019).*

(Continued)

*Primary Examiner* — Farid Homayounmehr
*Assistant Examiner* — Zhimei Zhu
(74) *Attorney, Agent, or Firm* — Harrity & Harrity, LLP

(57) ABSTRACT

A device may receive a malicious file associated with a network of network devices and may identify a file type and file characteristics associated with the malicious file. The device may determine one or more rules to apply to the malicious file based on the file type and the file characteristics associated with the malicious file and may apply the one or more rules to the malicious file to generate a partial file signature for the malicious file. The device may provide the partial file signature for the malicious file to one or more of the network devices of the network. The partial file signature may cause the one or more of the network devices to block the malicious file.

20 Claims, 10 Drawing Sheets

(56) References Cited

U.S. PATENT DOCUMENTS

| | | | |
|---|---|---|---|
| 2008/0141373 A1* | 6/2008 | Fossen | G06F 21/564 726/23 |
| 2009/0100162 A1* | 4/2009 | Holostov | G06F 15/16 709/223 |
| 2011/0138465 A1* | 6/2011 | Franklin | G06F 21/564 726/23 |
| 2011/0219451 A1* | 9/2011 | McDougal | G06F 21/562 726/23 |
| 2012/0240230 A1* | 9/2012 | Lee | G06F 21/564 726/24 |
| 2012/0304244 A1* | 11/2012 | Xie | H04L 63/1425 726/1 |
| 2013/0246378 A1* | 9/2013 | Hearnden | H04L 63/12 707/698 |
| 2013/0263226 A1* | 10/2013 | Sudia | H04L 63/08 726/4 |
| 2019/0228152 A1* | 7/2019 | Alme | G06F 21/565 |
| 2019/0332769 A1* | 10/2019 | Fralick | G06F 21/554 |
| 2020/0004965 A1* | 1/2020 | Vlaznev | G06F 21/566 |
| 2020/0120408 A1 | 4/2020 | Boyd et al. | |

OTHER PUBLICATIONS

Extended European Search Report for Application No. EP21191192.0, dated Feb. 1, 2022, 10 pages.

* cited by examiner

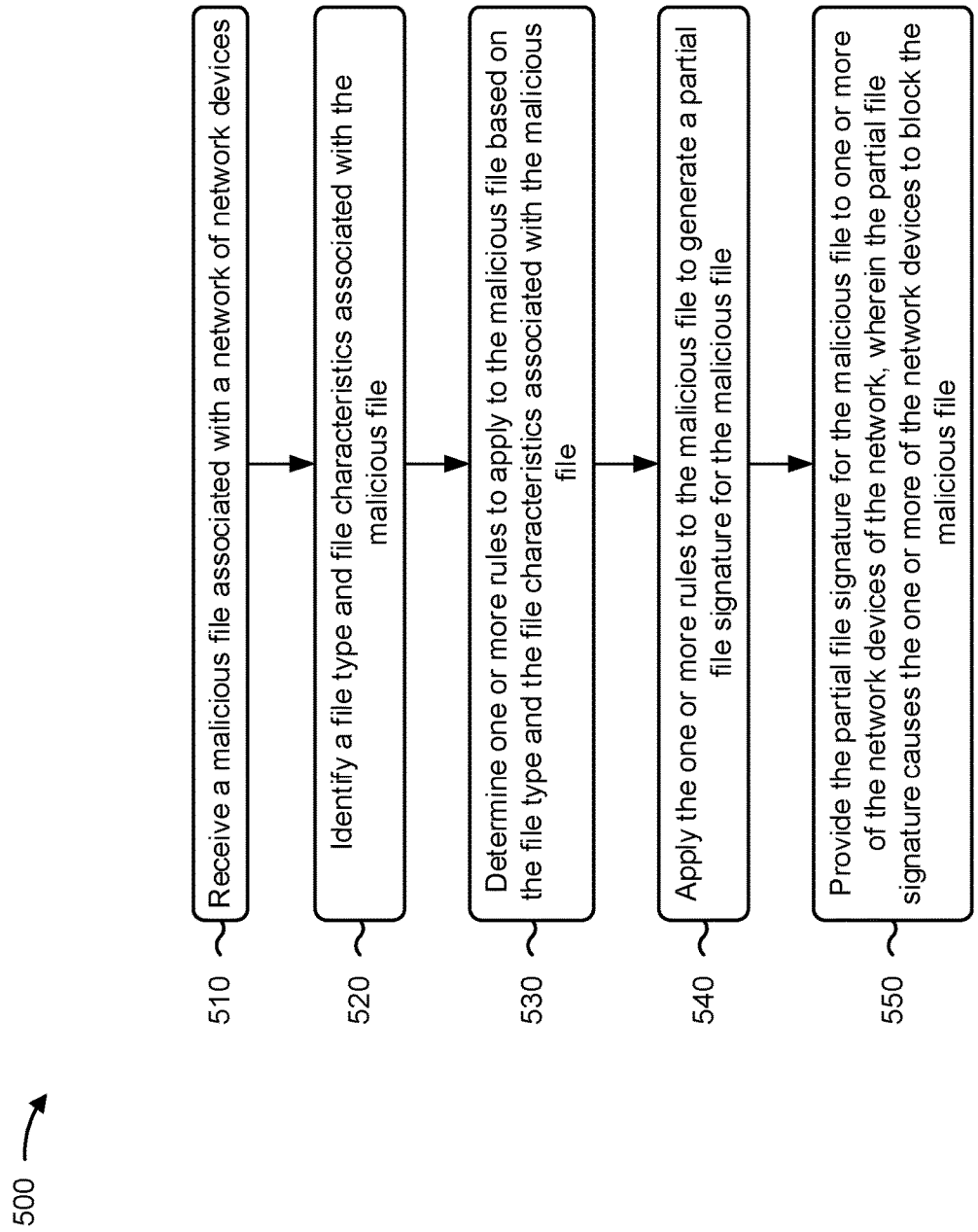

DETECTING AND BLOCKING A MALICIOUS FILE EARLY IN TRANSIT ON A NETWORK

BACKGROUND

Identifying malicious behavior (e.g., a cyberattack, malware, and/or the like) is typically a time-consuming process for a network security team. Many products exist that attempt to lure or trap a bad actor (e.g., a network intruder) into revealing themselves, and that trigger a wide variety of actions from a network (e.g., blocking the network intruder, stopping malware and/or a cyberattack, and/or the like).

SUMMARY

Some implementations described herein relate to a method. The method may include receiving a malicious file associated with a network of network devices and identifying a file type and file characteristics associated with the malicious file. The method may include determining one or more rules to apply to the malicious file based on the file type and the file characteristics associated with the malicious file and applying the one or more rules to the malicious file to generate a partial file signature for the malicious file. The method may include providing the partial file signature for the malicious file to one or more of the network devices of the network, where the partial file signature may cause the one or more of the network devices to block the malicious file.

Some implementations described herein relate to a device. The device may include one or more memories and one or more processors. The one or more processors may be configured to receive a malicious file generated by a compromised endpoint device associated with a network of network devices and identify a file type and file characteristics associated with the malicious file. The one or more processors may be configured to determine one or more rules to apply to the malicious file based on the file type and the file characteristics associated with the malicious file and apply the one or more rules to the malicious file to generate a partial file signature for the malicious file. The one or more processors may be configured to provide the partial file signature for the malicious file to one or more of the network devices of the network, where the partial file signature may cause the one or more of the network devices to block the malicious file.

Some implementations described herein relate to a non-transitory computer-readable medium that stores a set of instructions for a device. The set of instructions, when (e.g., where "when" means "if" or "in a case where" and does not mean "at the same time") executed by one or more processors of the device, may cause the device to receive a malicious file associated with a network of network devices and identify a file type and file characteristics associated with the malicious file. The set of instructions, when executed by the one or more processors of the device, may cause the device to determine one or more rules to apply to the malicious file based on the file type and the file characteristics associated with the malicious file and apply the one or more rules to the malicious file to generate a partial file signature for the malicious file. The set of instructions, when executed by the one or more processors of the device, may cause the device to provide the partial file signature for the malicious file to one or more of the network devices of the network, where the partial file signature causes the one or more of the network devices to block the malicious file and to transmit a file other than the malicious file.

BRIEF DESCRIPTION OF THE DRAWINGS

FIG. 5 is a flowchart of an example process for detecting and blocking a malicious file early in transit on a network.

DETAILED DESCRIPTION

Figure 1A:
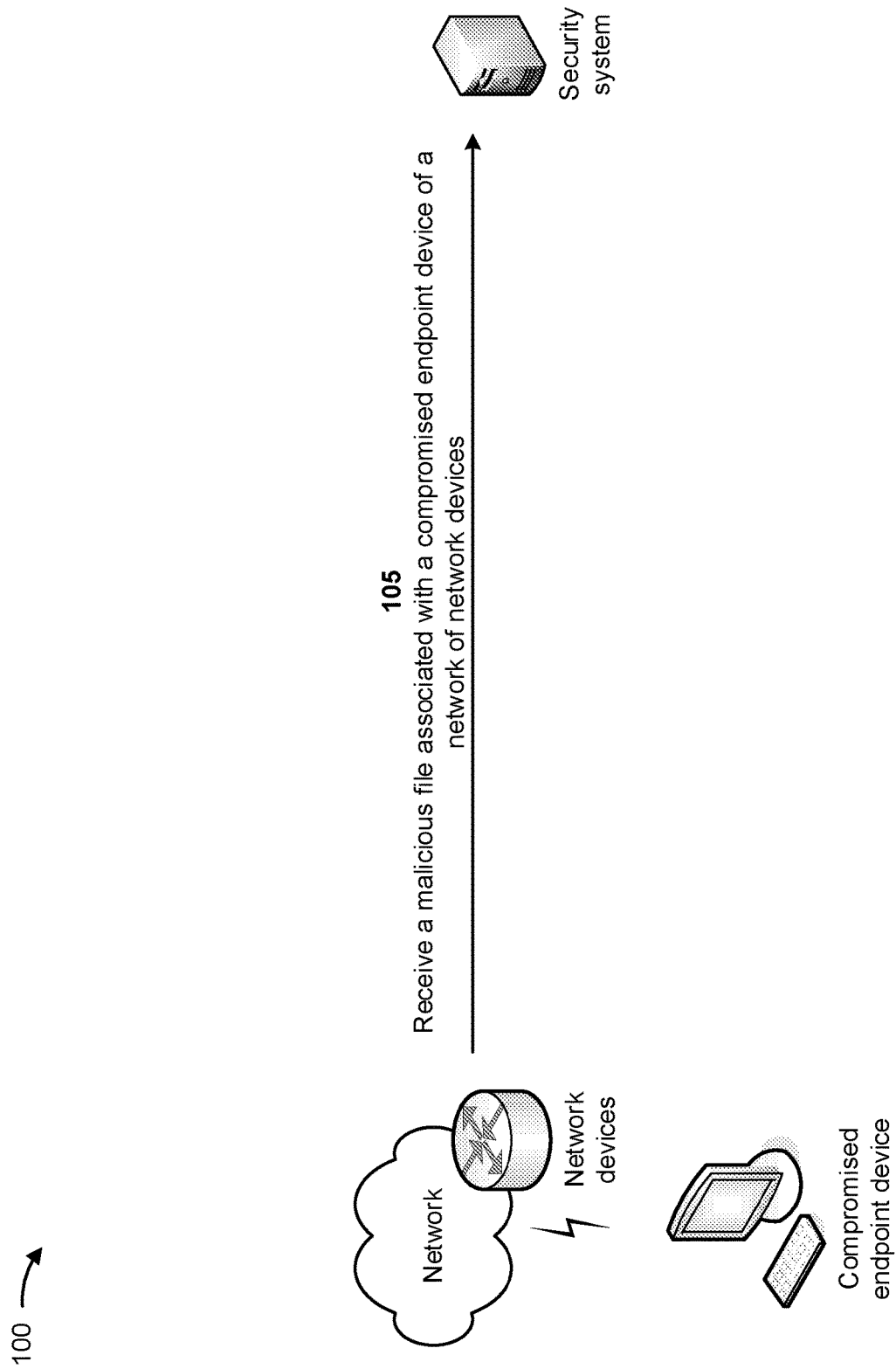
FIGS. 1A-1F are diagrams of an example associated with detecting and blocking a malicious file early in transit on a network.

The following detailed description of example implementations refers to the accompanying drawings. The same reference numbers in different drawings may identify the same or similar elements.

Malicious behavior, such as related to a malicious file, a cyberattack, malware, and/or the like, may be caused by a bad actor (e.g., a network intruder) based on compromising an endpoint device associated with a network. A malicious file may be blocked when the malicious file is identified (e.g., fingerprinted) and the fingerprint of the malicious file is identified. However, current techniques for blocking a malicious file may also create a fingerprint that matches other, benign files not associated with the malicious file (e.g., benign files are prone to false positive and/or negative indications of the malicious file). The current techniques also utilize a full-file hash to create the fingerprint for the malicious file. The entire malicious file needs to be utilized to create the full-file hash, which slows network traffic and consumes computing resources (e.g., processing resources, memory resources, communication resources, and/or the like), networking resources, and/or the like associated with processing the entire malicious file, generating false positive and/or negative indications of the malicious file, failing to identify the malicious file, attempting to address the false positive and/or negative indications of the malicious file, and/or the like.

Some implementations described herein relate to a security system that enables detecting and blocking a malicious file early in transit on a network. For example, the security system may receive a malicious file associated with a network of network devices and may identify a file type and file characteristics associated with the malicious file. The security system may determine one or more rules to apply to the malicious file based on the file type and the file characteristics associated with the malicious file and may apply the one or more rules to the malicious file to generate a partial file signature for the malicious file. The security system may provide the partial file signature for the malicious file to one or more of the network devices of the network. The partial file signature may cause the one or more of the network devices to block the malicious file.

In this way, the security system enables detecting and blocking a malicious file early in transit on a network. The security system may detect a malicious file inline and fingerprint the malicious file as early as possible during transmission of the malicious file. For some file types, the security system may utilize a first few bytes or kilobytes of the malicious file to generate a partial file signature for the malicious file. The security system may generate partial file signatures based on one or more rules applicable to different file types. For example, the security system may determine how many bytes or kilobytes of a certain type of file would be sufficient to generate a partial file signature that will not match on other, benign files. Thus, the security system conserves computing resources, networking resources, and/or the like that would otherwise have been consumed by processing the entire malicious file, generating false positive and/or negative indications of the malicious file, failing to identify the malicious file, attempting to address the false positive and/or negative indications of the malicious file and/or the like.

FIGS. 1A-1F are diagrams of an example 100 associated with detecting and blocking a malicious file early in transit on a network. As shown in FIGS. 1A-1F, example 100 includes a security system associated with a network of network devices, and a compromised endpoint device. Further details of the security system, the network, the network devices, and the endpoint device are provided elsewhere herein. In some implementations, the compromised endpoint device may be considered an attacker endpoint device when the endpoint device is purposefully utilized by an attacker to generate the malicious file.

As shown in FIG. 1A, and by reference number 105, the security system may receive, from the one or more network devices, a malicious file associated with the compromised endpoint device of the network. In some implementations, the malicious file may include a binary file (e.g., a Windows executable file, a Linux executable file, and/or the like), a regular executable file, an installer file, a self-extracting archive file, an archive file, a file with a non-structured header (e.g., a portable document format (PDF), a rich text format (RTF) file, and/or the like), and/or the like associated with a malicious behavior (e.g., a virus, a cyberattack, malware, a worm, a Trojan horse, spyware, and/or the like).

Figure 1B:
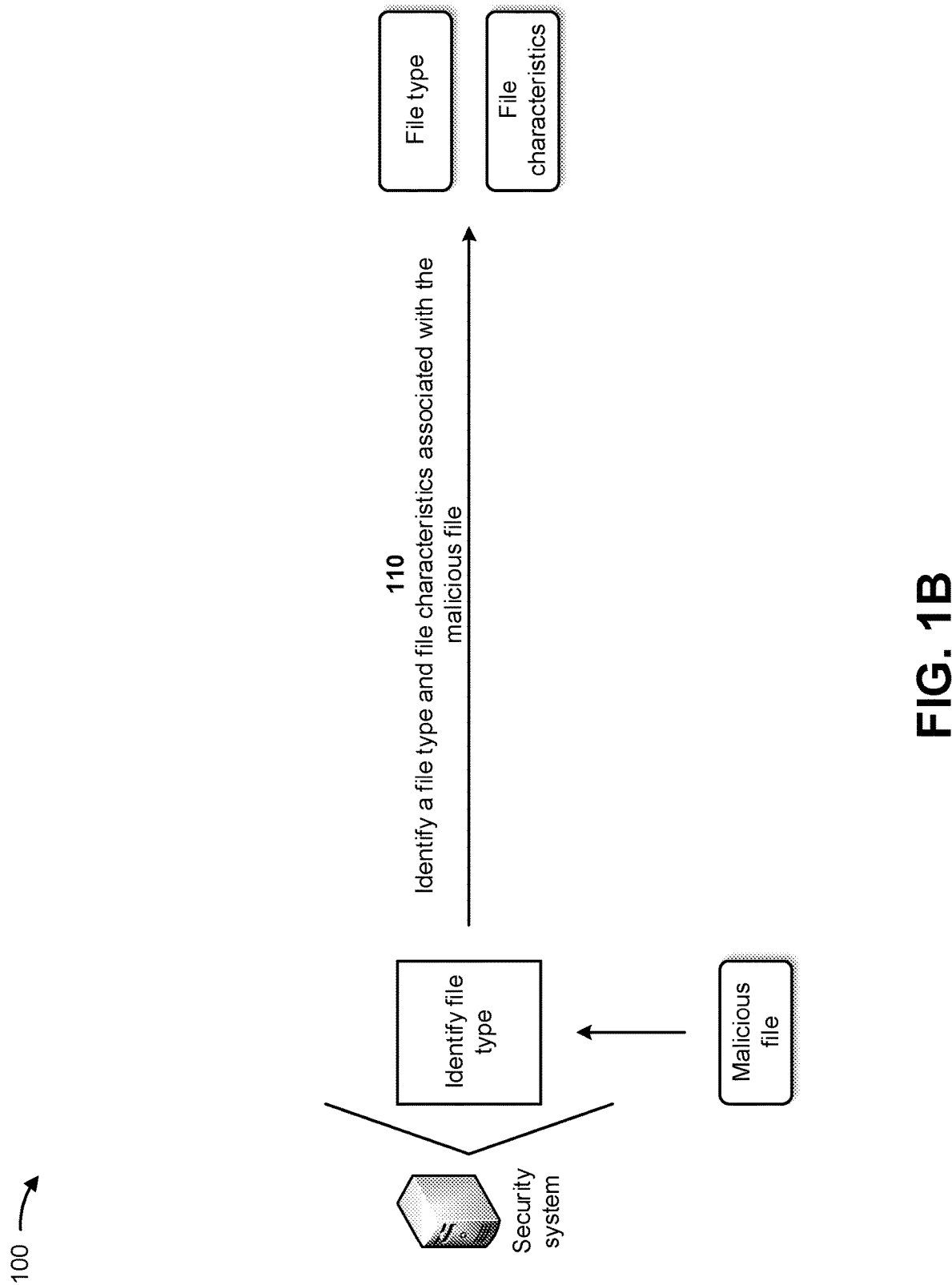

As shown in FIG. 1B, and by reference number 110, the security system may identify a file type and file characteristics associated with the malicious file. For example, the security system may determine that the file type of the malicious file is a binary file, an archive file, a file with a non-structured header, and/or the like. If the security system identifies the file type of the malicious file as a binary file, the security system may determine file characteristics associated with the binary file, such as whether the binary file is a Windows executable file, a Linux executable file, a regular executable file, an installer file, a self-extracting archive file, and/or the like. If the security system identifies the file type of the malicious file as a file with a non-structured header, the security system may determine file characteristics associated with the file with the non-structured header, such as whether the file with the non-structured header is a PDF file, an RTF file, and/or the like.

The file characteristics may also include malicious data identifying a malicious action (e.g., that a malicious file has been downloaded), a malicious communication to or from a network address (e.g., a media access control (MAC) address associated with the compromised endpoint device, an internet protocol (IP) address associated with the compromised endpoint device, a uniform resource locator (URL) address associated with the compromised endpoint device, and/or the like), a serial number associated with the compromised endpoint device, data identifying a manufacturer associated with the compromised endpoint device, data identifying a make or model associated with the compromised endpoint device, and/or the like.

In some implementations, the security system receives (e.g., from the network devices) network device data identifying the network devices associated with the network. The network device data, for a network device, may include a MAC address associated with the network device, an IP address associated with the network device, a serial number associated with the network device, data identifying a manufacturer associated with the network device, data identifying a make or model associated with the network device, topology data (e.g., data identifying neighboring endpoint devices and/or network devices, interconnections between the endpoint devices and/or the network devices, etc.), and/or the like. In some implementations, the security system configures the network devices to forward the network device data once the security system is notified of the malicious file.

The security system may store the malicious file, the malicious data, and/or the network device data in a data structure (e.g., a database, a table, a list, and/or the like) associated with the security system. The security system may store such data so that the security system may process such data to generate a security policy to block the malicious file from further infiltrating through the network.

Figure 1C:
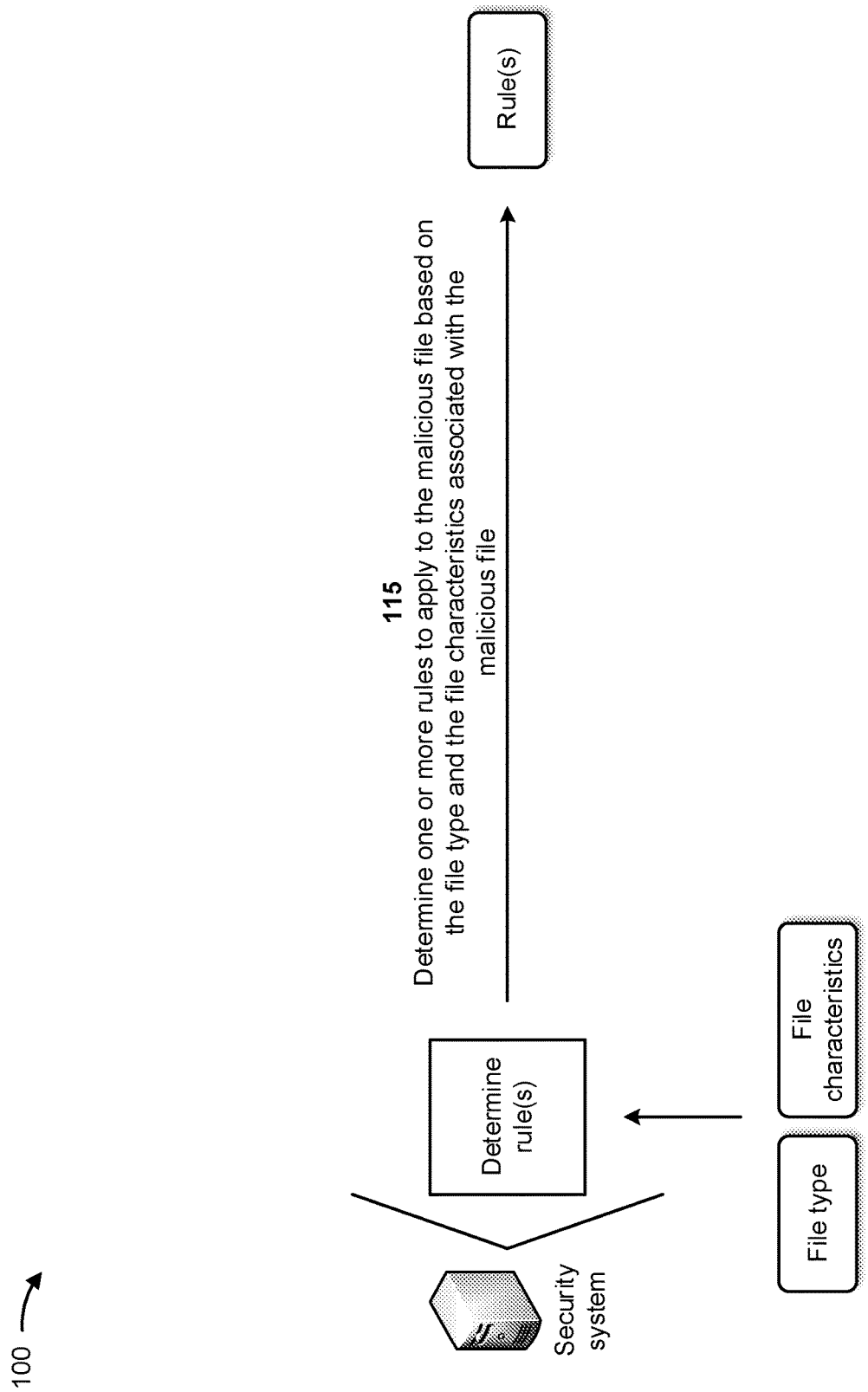

As shown in FIG. 1C, and by reference number 115, the security system may determine one or more rules to apply to the malicious file based on the file type and the file characteristics associated with the malicious file. For example, when the file type of the malicious file is a binary file, the security system may determine one or more rules that cause the security system to identify whether the malicious file is a regular executable file or an installer file. When the malicious file is identified as a regular executable file, the security system may determine one or more rules that cause the security system to hash (e.g., or utilize, transform to generate unique results, and/or the like) a first quantity of bytes of the malicious file to generate a partial file signature. When the malicious file is identified as an installer file, the security system may determine one or more rules that cause the security system to parse the malicious file to identify compressed data of the malicious file and hash the first quantity of bytes and the compressed data of the malicious file to generate the partial file signature. The first quantity of bytes may include a first ten bytes, a first one-hundred bytes, a first one-thousand bytes, a first ten-thousand bytes, and/or the like of the malicious file. Further details of the partial file signature are provided below.

In some implementations, when the file type of the malicious file is an archive file, the security system may determine one or more rules that cause the security system to hash a first quantity of bytes of the malicious file to generate a partial file signature.

In some implementations, when the file type of the malicious file is a file with a non-structured header, the security system may determine one or more rules that cause the security system to parse the malicious file to identify malicious bytes of code of the malicious file and hash a first quantity of bytes and the malicious bytes of code of the malicious file to generate a partial file signature. The aforementioned one or more rules are merely examples of rules that the security system may determine to apply to the malicious file, and the one or more rules may be different in a different context, such as for other file types associated with the malicious file.

Figure 1D:
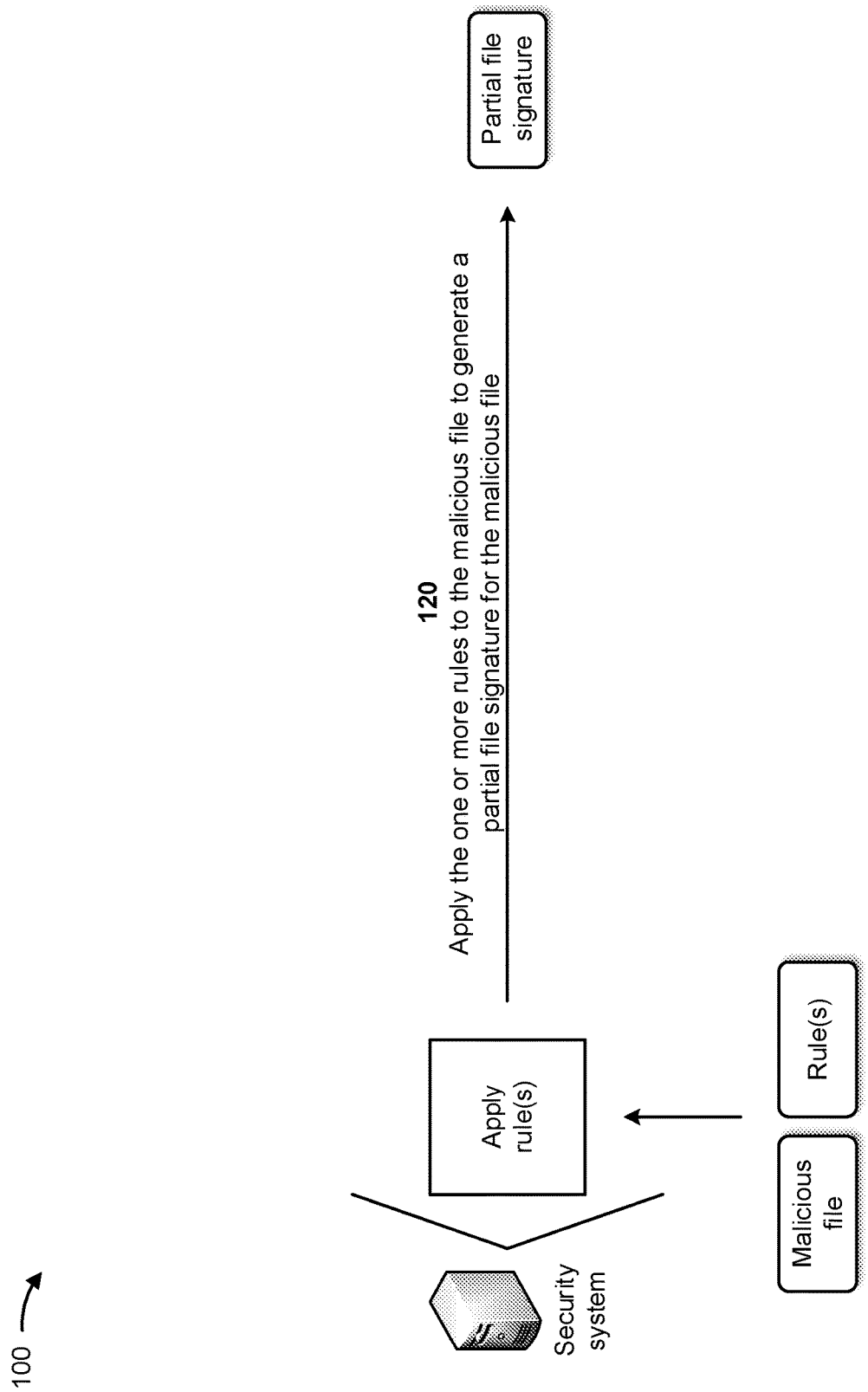

As shown in FIG. 1D, and by reference number 120, the security system may apply the one or more rules to the malicious file to generate a partial file signature for the malicious file. In some implementations, the security system may apply the one or more rules to the malicious file to generate the partial file signature, a fingerprint, or another identifier of the malicious file. The partial file signature may enable the malicious file to be quickly identified without processing the entire malicious file. Since the malicious file may include one of different file types (e.g., a Windows executable file, a Microsoft Office file, a Linux executable file, a MacOS binary file, and/or the like), the security system may generate the partial file signature based on applying different rules applicable to different file types. The partial file signature may include a hash of a portion of the malicious file that is sufficient to identify the malicious file and not to match on benign files other than the malicious file. For example, the security system may apply the one or more rules to the malicious file by hashing a first quantity of bytes of the malicious file to generate the partial file signature.

In some implementations, when the first quantity of bytes of the malicious file fail to identify the malicious file in a way that does not considerably reduce or eliminate false positive identifications, the security system may also hash, transform, utilize, and/or the like one or more portions of approximately a middle of the malicious file (e.g., within five percent, ten percent, and/or the like of the middle of the malicious file) to generate the partial file signature. For example, if the malicious file includes one-hundred bytes, the middle of the malicious file may be at the fiftieth byte and from approximately the forty fifth byte to approximately the fifty fifth byte. The security system may also apply one or more rules to the malicious file that prevent any false positives (e.g., identification of a benign file based on the partial file signature). Each of the one or more portions may include a quantity of bytes of the malicious file that is large enough to identify the malicious file (e.g., away from an end of the malicious file). For example, each of the one or more portions may include ten, twenty, thirty, forty, and/or the like bytes of approximately the middle portion of the malicious file.

When the file type of the malicious file is a binary file, the security system may apply one or more rules that cause the security system to identify whether the malicious file is a regular executable file or an installer file. When the malicious file is a regular executable file, the security system may apply one or more rules that cause the security system to hash a first quantity of bytes of the malicious file to generate the partial file signature. When the malicious file is an installer file, the security system may apply one or more rules that cause the security system to parse the malicious file to identify compressed data of the malicious file and hash the first quantity of bytes and the compressed data of the malicious file to generate the partial file signature.

When the file type of the malicious file is an archive file, the security system may apply one or more rules that cause the security system to hash a first quantity of bytes of the malicious file to generate the partial file signature.

When the file type of the malicious file is a file with a non-structured header, the security system may apply one or more rules that cause the security system to parse the malicious file to identify malicious bytes of code of the malicious file and hash a first quantity of bytes and the malicious bytes of code of the malicious file to generate the partial file signature.

Figure 1E:
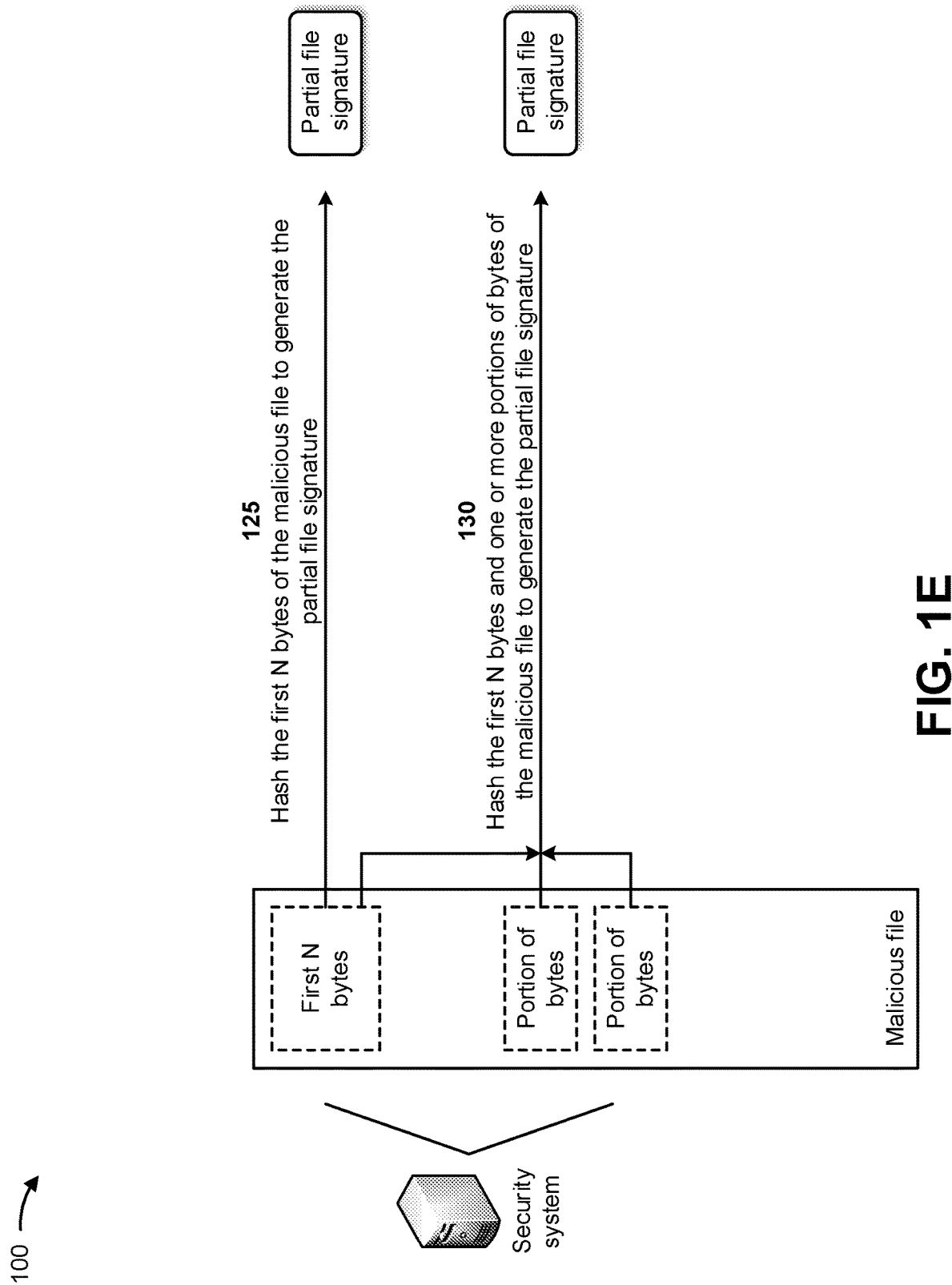

As shown in FIG. 1E, and by reference number 125, the security system may hash the first N bytes (e.g., the first quantity of bytes) of the malicious file to generate the partial file signature. For example, when the file type of the malicious file is a regular executable file or an archive file, the security system may apply one or more rules that cause the security system to hash the first quantity of bytes of the malicious file to generate the partial file signature.

Alternatively, and as further shown in FIG. 1E by reference number 130, the security system may hash the first N bytes and one or more portions of bytes (e.g., located approximately near the middle) of the malicious file to generate the partial file signature. For example, when the file type of the malicious file is an installer file or a file with a non-structured header, the security system may apply one or more rules that cause the security system to hash a first quantity of bytes and one or more portions of bytes of the malicious file to generate the partial file signature.

Figure 1F:
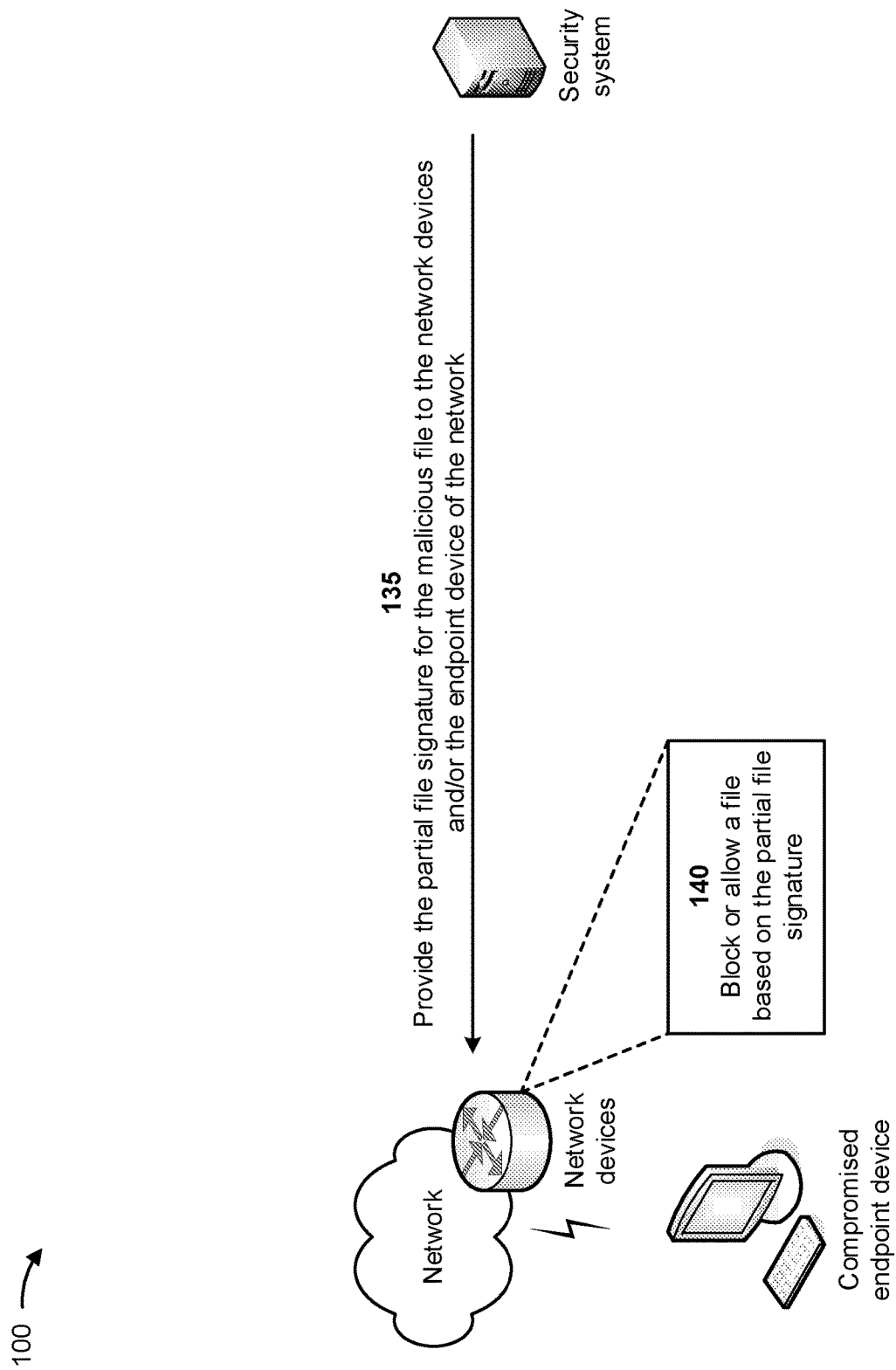

As shown in FIG. 1F, and by reference number 135, the security system may provide the partial file signature for the malicious file to the network devices and/or the endpoint device of the network. For example, the security system may utilize addresses of the network devices and the compromised endpoint device to provide the partial file signature to the network devices and the other endpoint devices. In some implementations, the security system may provide the partial file signature to one of the network devices with an instruction to forward the partial file signature to the other network devices. The one of the network devices may forward the partial file signature to the other network devices and/or the compromised endpoint device based on the instruction.

As further shown in FIG. 1F, and by reference number 140, the one or more network devices may block or allow a file based on the partial file signature. For example, if the file is the malicious file, the one or more network devices may match the malicious file with the partial file signature and may block the file based on matching the malicious file with the partial file signature. In another example, if the file is a benign file (e.g., a file other than the malicious file), the one or more network devices may fail to match the malicious file with the partial file signature and may allow or transmit the file based on failing to match the malicious file with the partial file signature.

In some implementations, the one or more network devices and/or the compromised endpoint device may block traffic associated with the malicious file based on the partial file signature, may quarantine traffic associated with the malicious file based on the partial file signature, and/or the like. In this way, the compromised endpoint device may be prevented from spreading the malicious file to the network.

In some implementations, the security system may push a security update to the compromised endpoint device so that the compromised endpoint device may be better protected from the malicious file. In this way, the security update may eliminate the malicious file from the compromised endpoint device.

In some implementations, the security system may cause the compromised endpoint device to initiate a malware and/or a virus scan to ensure that the compromised endpoint device is not infected with malware and/or a virus. In some implementations, the security system may cause the compromised endpoint device to be taken offline (e.g., disconnected from the network) so that the compromised endpoint device may not harm the network. In some implementations, the security system may send a notification for display on the compromised endpoint device (e.g., to inform a user that the endpoint device has been compromised).

In this way, the security system enables detecting and blocking a malicious file early in transit on a network. The security system may detect a malicious file inline and fingerprint the malicious file as early as possible during transmission of the malicious file. For some file types, the security system may utilize a first few bytes or kilobytes of the malicious file to generate a partial file signature for the malicious file. The security system may generate partial file signatures based on one or more rules applicable to different file types. For example, the security system may determine how many bytes or kilobytes of a certain type of file would be sufficient to generate a partial file signature that will not match on other benign files. Thus, the security system conserves computing resources, networking resources, and/or that like that would otherwise have been consumed by processing the entire malicious file, generating false positive and/or negative indications of the malicious file, failing to identify the malicious file, attempting to address the false positive and/or negative indications of the malicious file and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
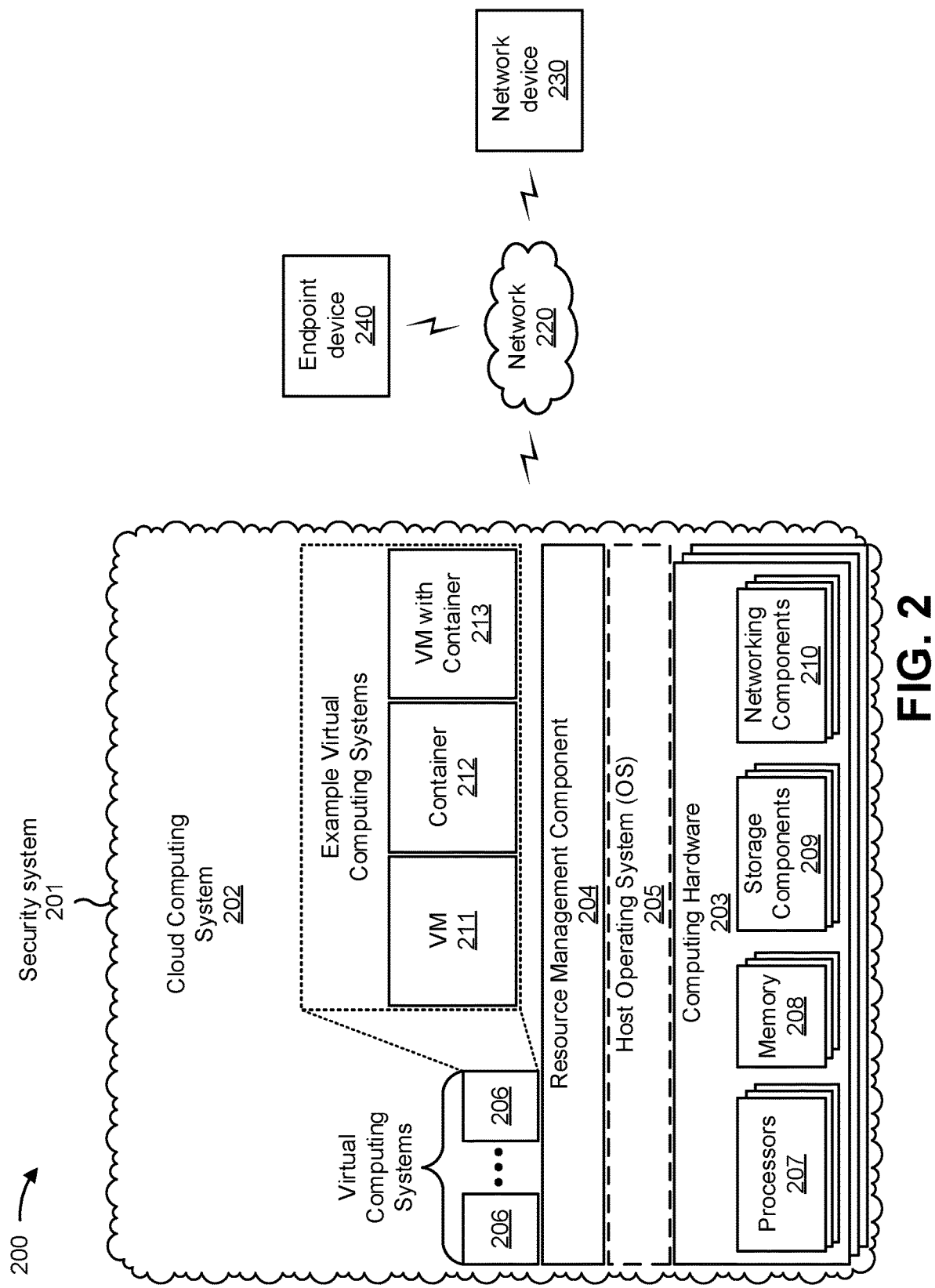
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a security system 201, which may include one or more elements of and/or may execute within a cloud computing system 202. The cloud computing system 202 may include one or more elements 203-213, as described in more detail below. As further shown in FIG. 2, environment 200 may include a network 220, a network device 230, and/or an endpoint device 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the security system 201 may include one or more elements 203-213 of the cloud computing system 202, may execute within the cloud computing system 202, and/or may be hosted within the cloud computing system 202, in some implementations, the security system 201 may not be cloud-based (e.g., may be implemented outside of a cloud computing system) or may be partially cloud-based. For example, the security system 201 may include one or more devices that are not part of the cloud computing system 202, such as device 300 of FIG. 3, which may include a stand-alone server or another type of computing device. The security system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of environment 200.

The network device 230 may include one or more devices capable of receiving, processing, storing, routing, and/or providing traffic (e.g., a packet and/or other information or metadata) in a manner described herein. For example, the network device 230 may include a router, such as a label switching router (LSR), a label edge router (LER), an ingress router, an egress router, a provider router (e.g., a provider edge router or a provider core router), a virtual router, or another type of router. Additionally, or alternatively, the network device 230 may include a gateway, a switch, a firewall, a hub, a bridge, a reverse proxy, a server (e.g., a proxy server, a cloud server, or a data center server), a load balancer, and/or a similar device. In some implementations, the network device 230 may be a physical device implemented within a housing, such as a chassis. In some implementations, the network device 230 may be a virtual device implemented by one or more computing devices of a cloud computing environment or a data center. In some implementations, a group of network devices 230 may be a group of data center nodes that are used to route traffic flow through a network.

The endpoint device 240 includes one or more devices capable of receiving, generating, storing, processing, and/or providing information, such as information described herein. For example, the endpoint device 240 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 240 may receive network traffic from and/or may provide network traffic to other endpoint devices 240, via the network 220 (e.g., by routing packets using the network devices 230 as intermediaries).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
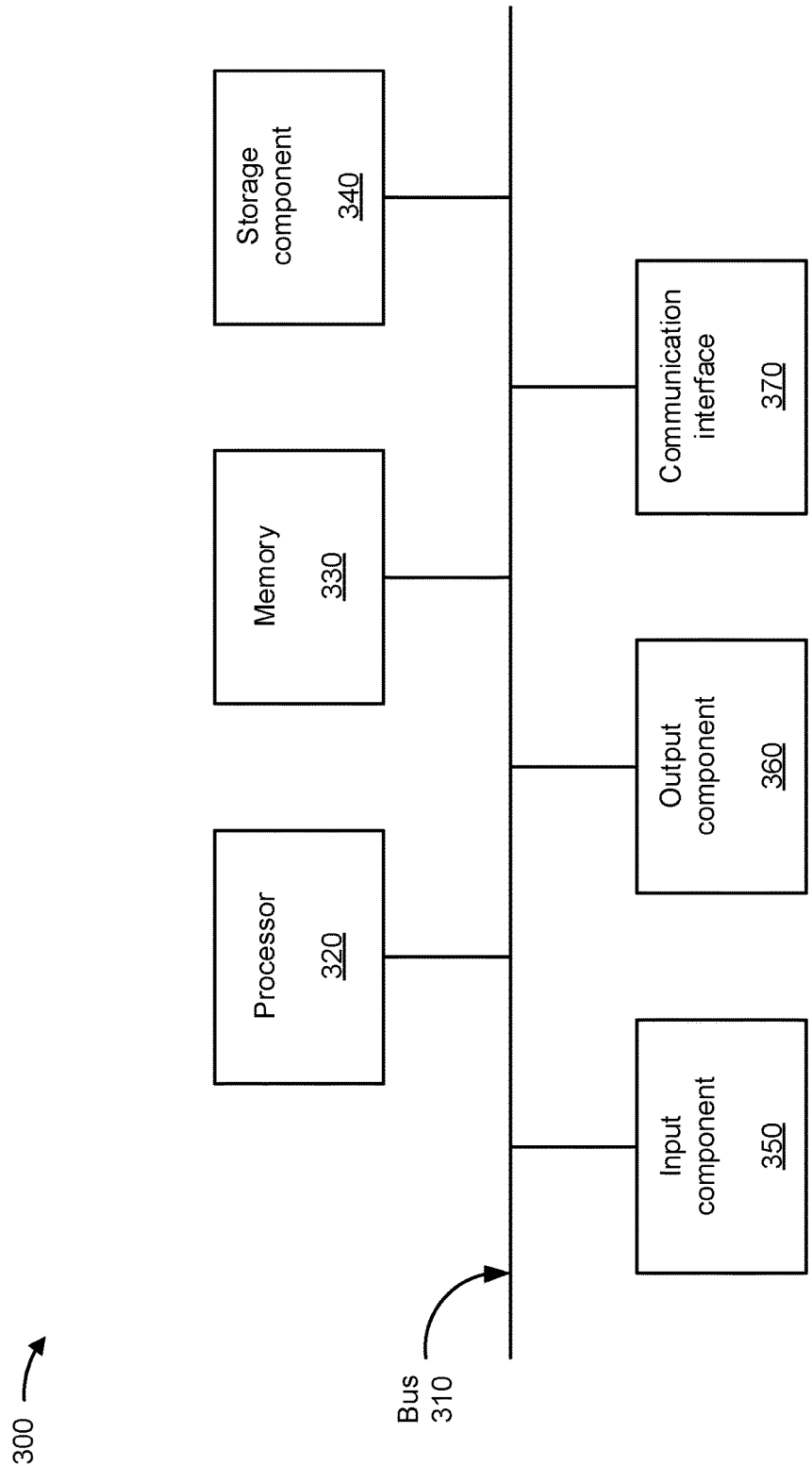
FIGS. 3 and 4 are diagrams of example components of one or more devices of FIG. 2.

FIG. 3 is a diagram of example components of one or more devices of FIG. 2. The example components may be included in a device 300, which may correspond to the security system 201, the network device 230, and/or the endpoint device 240. In some implementations, the security system 201, the network device 230, and/or the endpoint device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
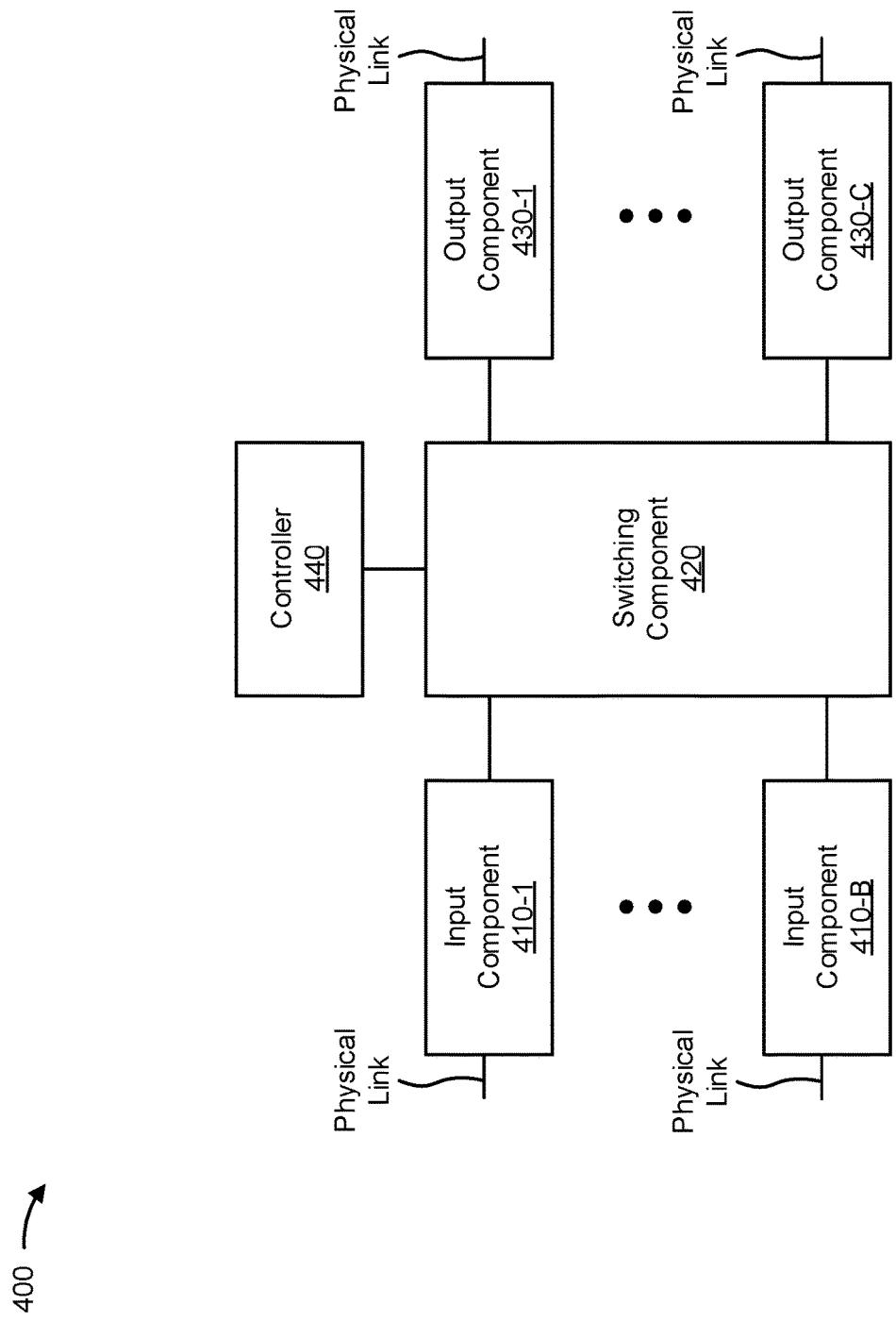

FIG. 4 is a diagram of example components of one or more devices of FIG. 2. The example components may be included in a device 400. Device 400 may correspond to the network device 230. In some implementations, the network device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for detecting and blocking a malicious file early in transit on a network. In some implementations, one or more process blocks of FIG. 5 may be performed by a device (e.g., the security system 201). In some implementations, one or more process blocks of FIG. 5 may be performed by another device or a group of devices separate from or including the device, such as a network device (e.g., the network device 230) and/or an endpoint device (e.g., the endpoint device 240). Additionally, or alternatively, one or more process blocks of FIG. 5 may be performed by one or more components of the device 300, such as the processor 320, the memory 330, the storage component 340, the input component 350, the output component 360, and/or the communication component 370. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a malicious file associated with a network of network devices (block 510). For example, the device may receive a malicious file associated with a network of network devices, as described above.

As further shown in FIG. 5, process 500 may include identifying a file type and file characteristics associated with the malicious file (block 520). For example, the device may identify a file type and file characteristics associated with the malicious file, as described above.

As further shown in FIG. 5, process 500 may include determining one or more rules to apply to the malicious file based on the file type and the file characteristics associated with the malicious file (block 530). For example, the device may determine one or more rules to apply to the malicious file based on the file type and the file characteristics associated with the malicious file, as described above.

As further shown in FIG. 5, process 500 may include applying the one or more rules to the malicious file to generate a partial file signature for the malicious file (block 540). For example, the device may apply the one or more rules to the malicious file to generate a partial file signature for the malicious file, as described above. In some implementations, applying the one or more rules to the malicious file to generate the partial file signature for the malicious file includes hashing a first quantity of bytes of the malicious file to generate the partial file signature. In some implementations, applying the one or more rules to the malicious file to generate the partial file signature for the malicious file includes hashing a first quantity of bytes and one or more portions of bytes of the malicious file to generate the partial file signature. In some implementations, the one or more portions of bytes are located at approximately the middle of the malicious file. In some implementations, the one or more portions of bytes are located away from an end of the malicious file.

In some implementations, when the file type of the malicious file is a binary file, applying the one or more rules to the malicious file to generate the partial file signature for the malicious file includes identifying whether the malicious file is a regular executable file or an installer file; hashing a first quantity of bytes of the malicious file to generate the partial file signature when the malicious file is a regular executable file; and when the malicious file is an installer file, parsing the malicious file to identify compressed data of the malicious file, and hashing the first quantity of bytes and the compressed data of the malicious file to generate the partial file signature.

In some implementations, when the file type of the malicious file is an archive file, applying the one or more rules to the malicious file to generate the partial file signature for the malicious file includes hashing a first quantity of bytes of the malicious file to generate the partial file signature.

In some implementations, when the file type of the malicious file is a file with a non-structured header, applying the one or more rules to the malicious file to generate the partial file signature for the malicious file includes parsing the malicious file to identify malicious bytes of code of the malicious file, and hashing a first quantity of bytes and the malicious bytes of code of the malicious file to generate the partial file signature.

In some implementations, when the file type of the malicious file is a regular executable file or an archive file, applying the one or more rules to the malicious file to generate the partial file signature for the malicious file includes hashing a first quantity of bytes of the malicious file to generate the partial file signature.

In some implementations, when the file type of the malicious file is an installer file or a file with a non-structured header, applying the one or more rules to the malicious file to generate the partial file signature for the malicious file includes hashing a first quantity of bytes and one or more portions of bytes of the malicious file to generate the partial file signature. In some implementations, the one or more portions of bytes include a specific quantity of bytes and are located at approximately the middle of the malicious file.

As further shown in FIG. 5, process 500 may include providing the partial file signature for the malicious file to one or more of the network devices of the network, wherein the partial file signature causes the one or more of the network devices to block the malicious file (block 550). For example, the device may provide the partial file signature for the malicious file to one or more of the network devices of the network, as described above. In some implementations, the partial file signature causes the one or more of the network devices to block the malicious file. In some implementations, the partial file signature causes the one or more of the network devices to transmit a file other than the malicious file.

Process 500 may include additional implementations, such as any single implementation or any combination of implementations described below and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, a malicious file generated by a compromised endpoint device associated with a network of network devices;
   identifying, by the device, a file type and file characteristics associated with the malicious file,
      wherein the file characteristics are based on the file type;
   determining, by the device, one or more rules to apply to the malicious file based on the file type and the file characteristics associated with the malicious file;

applying, by the device, the one or more rules to the malicious file to generate a partial file signature for the malicious file; and providing, by the device, the partial file signature for the malicious file to one or more of the network devices of the network, wherein the partial file signature causes the one or more of the network devices to block the malicious file.

2. The method of claim 1, wherein applying the one or more rules to the malicious file to generate the partial file signature for the malicious file comprises:

hashing a first quantity of bytes of the malicious file to generate the partial file signature.

3. The method of claim 1, wherein applying the one or more rules to the malicious file to generate the partial file signature for the malicious file comprises:

hashing a first quantity of bytes and one or more portions of bytes of the malicious file to generate the partial file signature.

4. The method of claim 3, wherein the one or more portions of bytes are located at approximately the middle of the malicious file.

5. The method of claim 3, wherein the one or more portions of bytes are located away from an end of the malicious file.

6. The method of claim 1, wherein, when the file type of the malicious file is a binary file, applying the one or more rules to the malicious file to generate the partial file signature for the malicious file comprises:

identifying whether the malicious file is a regular executable file or an installer file;

hashing a first quantity of bytes of the malicious file to generate the partial file signature when the malicious file is a regular executable file; and when the malicious file is an installer file:

parsing the malicious file to identify compressed data of the malicious file, and hashing the first quantity of bytes and the compressed data of the malicious file to generate the partial file signature.

7. The method of claim 1, wherein, when the file type of the malicious file is an archive file, applying the one or more rules to the malicious file to generate the partial file signature for the malicious file comprises:

hashing a first quantity of bytes of the malicious file to generate the partial file signature.

8. A device, comprising:

one or more memories; and one or more processors to:

receive a malicious file generated by a compromised endpoint device associated with a network of network devices;

identify a file type and file characteristics associated with the malicious file, wherein the file characteristics are based on the file type;

determine one or more rules to apply to the malicious file based on the file type and the file characteristics associated with the malicious file;

apply the one or more rules to the malicious file to generate a partial file signature for the malicious file; and provide the partial file signature for the malicious file to one or more of the network devices of the network, wherein the partial file signature causes the one or more of the network devices to block the malicious file.

9. The device of claim 8, wherein, when the file type of the malicious file is a file with a non-structured header, the one or more processors, to apply the one or more rules to the malicious file to generate the partial file signature for the malicious file, are to:

parse the malicious file to identify malicious bytes of code of the malicious file; and hash a first quantity of bytes and the malicious bytes of code of the malicious file to generate the partial file signature.

10. The device of claim 8, wherein the partial file signature causes the one or more of the network devices to transmit a file other than the malicious file.

11. The device of claim 8, wherein, when the file type of the malicious file is a regular executable file or an archive file, the one or more processors, to apply the one or more rules to the malicious file to generate the partial file signature for the malicious file, are to:

hash a first quantity of bytes of the malicious file to generate the partial file signature.

12. The device of claim 8, wherein, when the file type of the malicious file is an installer file or a file with a non-structured header, the one or more processors, to apply the one or more rules to the malicious file to generate the partial file signature for the malicious file, are to:

hash a first quantity of bytes and one or more portions of bytes of the malicious file to generate the partial file signature.

13. The device of claim 12, wherein the one or more portions of bytes include a specific quantity of bytes.

14. The device of claim 12, wherein the one or more portions of bytes are located at approximately the middle of the malicious file.

15. A non-transitory computer-readable medium storing a set of instructions, the set of instructions comprising:

one or more instructions that, when executed by one or more processors of a device, cause the device to:

receive a malicious file associated with a network of network devices;

identify a file type and file characteristics associated with the malicious file, wherein the file characteristics are based on the file type;

determine one or more rules to apply to the malicious file based on the file type and the file characteristics associated with the malicious file;

apply the one or more rules to the malicious file to generate a partial file signature for the malicious file; and provide the partial file signature for the malicious file to one or more of the network devices of the network, wherein the partial file signature causes the one or more of the network devices to block the malicious file and to transmit a file other than the malicious file.

16. The non-transitory computer-readable medium of claim 15, wherein the one or more instructions, that cause the device to apply the one or more rules to the malicious file to generate the partial file signature for the malicious file, cause the device to one of:

hash a first quantity of bytes of the malicious file to generate the partial file signature; or hash the first quantity of bytes and one or more portions of bytes of the malicious file to generate the partial file signature.

17. The non-transitory computer-readable medium of claim 16, wherein the one or more portions of bytes are located at approximately the middle of the malicious file.

18. The non-transitory computer-readable medium of claim 15, wherein, when the file type of the malicious file is a binary file, the one or more instructions, that cause the device to apply the one or more rules to the malicious file to generate the partial file signature for the malicious file, cause the device to:
- identify whether the malicious file is a regular executable file or an installer file;
- hash a first quantity of bytes of the malicious file to generate the partial file signature when the malicious file is a regular executable file; and
- when the malicious file is an installer file:
  - parse the malicious file to identify compressed data of the malicious file, and
  - hash the first quantity of bytes and the compressed data of the malicious file to generate the partial file signature.

19. The non-transitory computer-readable medium of claim 15, wherein, when the file type of the malicious file is an archive file, the one or more instructions, that cause the device to apply the one or more rules to the malicious file to generate the partial file signature for the malicious file, cause the device to:
- hash a first quantity of bytes of the malicious file to generate the partial file signature.

20. The non-transitory computer-readable medium of claim 15, wherein, when the file type of the malicious file is a file with a non-structured header, the one or more instructions, that cause the device to apply the one or more rules to the malicious file to generate the partial file signature for the malicious file, cause the device to:
- parse the malicious file to identify malicious bytes of code of the malicious file; and
- hash a first quantity of bytes and the malicious bytes of code of the malicious file to generate the partial file signature.

* * * * *